(12) United States Patent
Belassel et al.

(10) Patent No.: US 12,480,895 B2
(45) Date of Patent: Nov. 25, 2025

(54) X-RAY SOURCE FOR X-RAY DIFFRACTION APPARATUS, RELATED APPARATUS AND METHOD

(71) Applicant: PROTO PATENTS LTD., LaSalle (CA)

(72) Inventors: Mohammed Belassel, LaSalle (CA); Alec Iskra, LaSalle (CA); Stanislav Veinberg, LaSalle (CA)

(73) Assignee: PROTO PATENTS LTD., Lasalle (CA)

( * ) Notice: Subject to any disclaimer, the term of this patent is extended or adjusted under 35 U.S.C. 154(b) by 200 days.

(21) Appl. No.: 18/271,415

(22) PCT Filed: Jan. 7, 2022

(86) PCT No.: PCT/CA2022/050017
§ 371 (c)(1),
(2) Date: Jul. 7, 2023

(87) PCT Pub. No.: WO2022/147623
PCT Pub. Date: Jul. 14, 2022

(65) Prior Publication Data
US 2024/0060911 A1    Feb. 22, 2024

Related U.S. Application Data

(60) Provisional application No. 63/135,061, filed on Jan. 8, 2021.

(51) Int. Cl.
*G01N 23/20008*    (2018.01)
*G01N 23/207*    (2018.01)
(Continued)

(52) U.S. Cl.
CPC ..... *G01N 23/20008* (2013.01); *G01N 23/207* (2013.01); *H01J 35/04* (2013.01);
(Continued)

(58) Field of Classification Search
None
See application file for complete search history.

(56) References Cited

U.S. PATENT DOCUMENTS 4,064,411 A * 12/1977 Iwasaki ............... H01J 35/13
378/143
5,515,414 A    5/1996 D'Achard Van Enschut et al.
(Continued)

FOREIGN PATENT DOCUMENTS

JP    H01109166 U  *  7/1989
JP    H0438453 Y2  *  9/1992
JP    2827121 B2   * 11/1998

OTHER PUBLICATIONS

International Search Report for International Application No. PCT/CA2022/050017 dated Mar. 14, 2022.
Written Opinion of the International Searching Authority in International Application No. PCT/CA2022/050017 dated Mar. 14, 2022.

*Primary Examiner* — Thomas R Artman
(74) *Attorney, Agent, or Firm* — The Marbury Law Group, PLLC

(57) ABSTRACT

There is provided an X-ray source for an X-ray diffraction apparatus. The source includes a target and a filament operable to generate an X-ray beam, a vacuum chamber, outer and inner housings and a rotation mechanism. The chamber encloses the target and the filament and has a window transparent to the beam. The outer housing is mountable to the apparatus and includes outer housing openings. The inner housing encloses the chamber and is mounted to the outer housing. The inner housing includes inner housing openings positioned to be aligned with the window and the outer housing openings. The rotation mechanism is in engagement with the outer housing and the inner housing and is operable to provide a rotation between the inner outer housings between a line focus configuration, wherein the filament is parallel to the window, and a point (Continued)

focus configuration, wherein the filament is perpendicular to the window.

20 Claims, 12 Drawing Sheets

(51) Int. Cl.
  *H01J 35/04* (2006.01)
  *H01J 35/12* (2006.01)
  *H01J 35/16* (2006.01)
  *H05G 1/04* (2006.01)

(52) U.S. Cl.
  CPC .............. *H01J 35/13* (2019.05); *H01J 35/16* (2013.01); *H05G 1/04* (2013.01); *G01N 2223/056* (2013.01); *G01N 2223/1016* (2013.01); *G01N 2223/204* (2013.01); *H01J 2235/066* (2013.01); *H01J 2235/162* (2013.01)

(56) References Cited

U.S. PATENT DOCUMENTS

| | | | |
|---|---|---|---|
| 6,333,967 B1* | 12/2001 | Osaka | H05G 1/02 378/121 |
| 7,248,672 B2* | 7/2007 | Durst | H01J 35/112 378/197 |
| 7,421,064 B2* | 9/2008 | Frenk | H01J 35/12 378/119 |
| 8,126,117 B2* | 2/2012 | Verman | B82Y 10/00 378/135 |
| 2006/0239408 A1 | 10/2006 | Durst et al. | |
| 2008/0112539 A1* | 5/2008 | Frenk | H01J 35/12 378/141 |
| 2011/0188636 A1* | 8/2011 | Verman | B82Y 10/00 378/135 |
| 2014/0029729 A1 | 1/2014 | Ducharczyk | |
| 2024/0060911 A1* | 2/2024 | Belassel | H01J 35/18 |

\* cited by examiner

X-RAY SOURCE FOR X-RAY DIFFRACTION APPARATUS, RELATED APPARATUS AND METHOD

RELATED APPLICATIONS

This application claims the benefit of priority to PCT/CA2022/050017 titled "X-RAY SOURCE FOR X-RAY DIFFRACTION APPARATUS, RELATED APPARATUS AND METHOD" filed Jan. 7, 2022, which claims the benefit of priority to Provisional Application No. 63/135,061 filed Jan. 8, 2021, the entire contents of both of which are hereby incorporated by reference for all purposes.

BACKGROUND

A) Technical Field

The technical field generally relates to the field of X-ray diffraction techniques. More particularly, it relates to an X-ray source for an X-ray diffraction apparatus, related apparatuses, and associated methods.

B) Description

Many techniques in the field of X-ray diffraction rely on an X-ray diffraction apparatus that may be alternatively operated in a line focus configuration and a point focus configuration. However, changing between the line focus configuration and the point focus configuration in conventional X-ray diffraction apparatuses is challenging. For example, it may be required to remove the X-ray tube from the X-ray diffraction apparatus, and then rearrange some components of the X-ray diffraction apparatus or X-ray tube to achieve the desired or needed configuration. Such rearrangements of the components forming the X-ray diffraction apparatus may slightly alter the properties of the X-ray beam (e.g., position, size, orientation, diffraction peak shape, and/or the like). As a result, the alignment between the beam and the center of the goniometer or any other components of the X-ray diffraction apparatus may be compromised when alternating between the line focus configuration and the point focus configuration using existing X-ray diffraction apparatuses. In some instances, switching from the line focus configuration to the point focus configuration (or vice-versa) may require a complete realignment of the X-ray tube or some of the components thereof. This process is not only time-consuming, but also suffers from a generally limited reliability and precision.

In light of the above, challenges still exist in the field of X-ray sources for X-ray diffraction apparatus.

SUMMARY

In accordance with one aspect, there is provided an X-ray source for an X-ray diffraction apparatus, the X-ray source including:
  an anode target and a cathode filament, the cathode filament having an elongated body, the anode target and the cathode filament being operable to generate an X-ray beam;
  a vacuum chamber enclosing the anode target and the cathode filament, the vacuum chamber having a window transparent to the X-ray beam;
  an outer housing mountable to the X-ray diffraction apparatus in a fixed position, the outer housing including outer housing openings; and
  an inner housing enclosing the vacuum chamber and rotatably mounted to the outer housing, the inner housing including inner housing openings positioned to be aligned with the window and the outer housing openings, the inner housing being rotatable with respect to the outer housing between a line focus configuration and a point focus configuration,
wherein, upon rotation of the inner housing with respect to the outer housing, the cathode filament is engaged in rotation therewith and the outer housing remains in the fixed position, such that:
  in the line focus configuration, the elongated body of the cathode filament is substantially parallel to the window, thereby producing a line-shaped X-ray beam; and
  in the point focus configuration, the elongated body of the cathode filament is substantially perpendicular to the window, thereby producing a point-shaped X-ray beam.

In some embodiments, the outer housing and at least a portion of the inner housing are concentric.

In some embodiments, the outer housing includes two outer housing ends, each outer housing end being opposite one from another; and the inner housing includes two inner housing ends, each inner housing end being opposite one from another, at least one of the two inner housing ends being mechanically engaged with a corresponding one of the two outer housing ends.

In some embodiments, the X-ray source further includes a rotation mechanism mechanically engaging said at least one of the two inner housing ends with said corresponding one of the two housing ends.

In some embodiments, the rotation mechanism includes at least one bearing.

In some embodiments, the rotation mechanism includes:
  a first bearing contacting an inner periphery of the outer housing at a first one of the two outer housing ends and an outer periphery of the inner housing at a first one of the two inner housing ends; and
  a second bearing contacting the inner periphery of the outer housing at a second one of the two outer housing ends and the outer periphery of the inner housing at a predetermined position, the predetermined position being located between the first one of the two inner housing ends and a second one of the two inner housing ends.

In some embodiments, the outer housing is mountable to a goniometer of the X-ray diffraction, the X-ray beam being aligned with a center of the goniometer in the fixed position.

In some embodiments, the X-ray source further includes a locking mechanism for blocking the inner housing in one of the line focus configuration and the point focus configuration.

In some embodiments, the locking mechanism is selected from the group consisting of a screw, pins, spring pins and electromagnets.

In some embodiments, the X-ray source further includes a heat transfer channel in thermal contact with the anode target, the heat transfer channel being configured for receiving and circulating a heat transfer fluid therein.

In some embodiments, the heat transfer fluid is gaseous, liquid or two-phased.

In some embodiments, the heat transfer fluid is selected from the group consisting of distilled water, glycol solution, antifreeze, and any combinations thereof.

In some embodiments, the anode target is made from an anode target material selected from the group consisting of chromium, cobalt, copper, molybdenum, silver, and tungsten.

In some embodiments, the cathode filament is made from a material having a high melting point.

In accordance with another aspect, there is provided an X-ray diffraction apparatus, including:
  an X-ray source for irradiating a sample with an X-ray beam, the X-ray source including:
    an anode target and a cathode filament, the cathode filament having an elongated body, the anode target and the cathode filament being operable to generate the X-ray beam;
    a vacuum chamber enclosing the anode target and the cathode filament, the vacuum chamber having a window transparent to the X-ray beam;
    an outer housing mountable to the X-ray diffraction apparatus in a fixed position, the outer housing including outer housing openings; and
    an inner housing enclosing the vacuum chamber and rotatably mounted to the outer housing, the inner housing including inner housing openings positioned to be aligned with the window and the outer housing openings, the inner housing being rotatable with respect to the outer housing between a line focus configuration and a point focus configuration,
    wherein, upon rotation of the inner housing with respect to the outer housing, the cathode filament is engaged in rotation therewith and the outer housing remains in the fixed position, such that:
      in the line focus configuration, the elongated body of the cathode filament is substantially parallel to the window, thereby producing a line-shaped X-ray beam; and
      in the point focus configuration, the elongated body of the cathode filament is substantially perpendicular to the window, thereby producing a point-shaped X-ray beam;
  a sample holder for receiving the sample, the sample being positioned to receive the X-ray beam when held by the sample holder; and
  a detector for receiving X-rays scattered from the sample and outputting an X-ray diffraction pattern therefrom.

In some embodiments, the outer housing and at least a portion of the inner housing are concentric.

In some embodiments, the outer housing includes two outer housing ends, each outer housing end being opposite one from another; and the inner housing includes two inner housing ends, each inner housing end being opposite one from another, at least one of the two inner housing ends being mechanically engaged with a corresponding one of the two outer housing ends.

In some embodiments, the X-ray diffraction apparatus further includes a rotation mechanism mechanically engaging said at least one of the two inner housing ends with said corresponding one of the two housing ends.

In some embodiments, the rotation mechanism includes at least one bearing.

In some embodiments, the rotation mechanism includes:
  a first bearing contacting an inner periphery of the outer housing at a first one of the two outer housing ends and an outer periphery of the inner housing at a first one of the two inner housing ends; and
  a second bearing contacting the inner periphery of the outer housing at a second one of the two outer housing ends and the outer periphery of the inner housing at a predetermined position, the predetermined position being located between the first one of the two inner housing ends and a second one of the two inner housing ends.

In some embodiments, the outer housing is mountable to a goniometer of the X-ray diffraction, the X-ray beam being aligned with a center of the goniometer in the fixed position.

In some embodiments, the X-ray diffraction apparatus further includes a locking mechanism for blocking the inner housing in one of the line focus configuration and the point focus configuration.

In some embodiments, the locking mechanism is selected from the group consisting of a screw, pins, spring pins and electromagnets.

In some embodiments, the X-ray diffraction apparatus further includes a heat transfer channel in thermal contact with the anode target, the heat transfer channel being configured for receiving and circulating a heat transfer fluid therein.

In some embodiments, the heat transfer fluid is gaseous, liquid or two-phased.

In some embodiments, the heat transfer fluid is selected from the group consisting of distilled water, glycol solution, antifreeze, and any combinations thereof.

In some embodiments, the X-ray diffraction apparatus further includes a filter positioned between the window and the sample to condition the X-ray beam.

In some embodiments, the filter is a thin sheet of aluminium.

In some embodiments, the anode target is made from an anode target material selected from the group consisting of chromium, cobalt, copper, molybdenum, silver, and tungsten.

In some embodiments, the cathode filament is made from a material having a high melting point.

In some embodiments, the X-ray diffraction apparatus further includes a motor assembly in driving engagement with the inner housing, the motor assembly being operable to provide the rotation between the inner housing and the outer housing.

In some embodiments, the X-ray diffraction apparatus further includes a controlling unit for controlling the motor assembly.

In accordance with another aspect, there is provided an X-ray source for an X-ray diffraction apparatus, the X-ray source including:
  an anode target and a cathode filament, the cathode filament having an elongated body, the anode target and the cathode filament being operable to generate an X-ray beam;
  a vacuum chamber enclosing the anode target and the cathode filament, the vacuum chamber having a window transparent to the X-ray beam;
  an outer housing mountable to the X-ray diffraction apparatus in a fixed position, the outer housing including outer housing openings; and
  an inner housing enclosing the vacuum chamber and rotatably mounted to the outer housing, the inner housing including inner housing openings positioned to be aligned with the window and the outer housing openings; and
  a rotation mechanism in engagement with the outer housing and the inner housing, the rotation mechanism being operable to provide a relative rotation between the inner housing and the outer housing, thereby rotating between a line focus configuration and a point focus configuration, wherein:
in the line focus configuration, the elongated body of the cathode filament is substantially parallel to the window, thereby producing a line-shaped X-ray beam; and
in the point focus configuration, the elongated body of the cathode filament is substantially perpendicular to the window, thereby producing a point-shaped X-ray beam.

In some embodiments, the outer housing and at least a portion of the inner housing are concentric.

In some embodiments, the outer housing includes two outer housing ends, each outer housing end being opposite one from another; and the inner housing includes two inner housing ends, each inner housing end being opposite one from another, at least one of the two inner housing ends being mechanically engaged with a corresponding one of the two outer housing ends.

In some embodiments, the X-ray source further includes a rotation mechanism mechanically engaging said at least one of the two inner housing ends with said corresponding one of the two housing ends.

In some embodiments, the rotation mechanism includes at least one bearing.

In some embodiments, the rotation mechanism includes:
a first bearing contacting an inner periphery of the outer housing at a first one of the two outer housing ends and an outer periphery of the inner housing at a first one of the two inner housing ends; and
a second bearing contacting the inner periphery of the outer housing at a second one of the two outer housing ends and the outer periphery of the inner housing at a predetermined position, the predetermined position being located between the first one of the two inner housing ends and a second one of the two inner housing ends.

In some embodiments, the outer housing is mountable to a goniometer of the X-ray diffraction, the X-ray beam being aligned with a center of the goniometer in the fixed position.

In some embodiments, the X-ray source further includes a locking mechanism for blocking the inner housing in one of the line focus configuration and the point focus configuration.

In some embodiments, the locking mechanism is selected from the group consisting of a screw, pins, spring pins and electromagnets.

In some embodiments, the X-ray source further includes a heat transfer channel in thermal contact with the anode target, the heat transfer channel being configured for receiving and circulating a heat transfer fluid therein.

In some embodiments, the heat transfer fluid is gaseous, liquid or two-phased.

In some embodiments, the heat transfer fluid is selected from the group consisting of distilled water, glycol solution, antifreeze, and any combinations thereof.

In some embodiments, the anode target is made from an anode target material selected from the group consisting of chromium, cobalt, copper, molybdenum, silver, and tungsten.

In some embodiments, the cathode filament is made from a material having a high melting point.

In accordance with another aspect, there is provided an X-ray diffraction apparatus, including:
an X-ray source as described herein;
a sample holder for holding the sample, the sample being positioned to receive the X-ray beam when held by the sample holder; and
a detector for receiving X-rays scattered from the sample and outputting an X-ray diffraction pattern therefrom.

In accordance with another aspect, there is provided a method for producing an X-ray beam, the method including:
mounting an X-ray source to an X-ray diffraction apparatus, the X-ray source including an outer housing and an inner housing rotatably mounted to the outer housing, the inner housing enclosing a vacuum chamber, the vacuum chamber enclosing an anode target and a cathode filament operable to generate an X-ray beam;
selecting between a line focus configuration and a point focus configuration;
providing a relative rotation between the inner housing and the outer housing to achieve the selected line focus configuration or point focus configuration; and
operating the anode target and the cathode filament to generate the X-ray beam according to the selected line focus configuration or point focus configuration.

In some embodiments, the method further includes:
selecting another one of the line focus configuration and the point focus configuration and subsequently providing a subsequent relative rotation between the inner housing and the outer housing to achieve a subsequent line focus configuration or point focus configuration; and
operating the anode target and the cathode filament to generate the X-ray beam according to the subsequent line focus configuration or point focus configuration.

In accordance with another aspect, there is provided a method for manufacturing an X-ray source, the method including:
providing a vacuum chamber enclosing an anode target and a cathode filament;
mounting the vacuum chamber within an inner housing; and
rotatably mounting the inner housing to an outer housing, the inner housing being rotatable with respect to the outer housing between a line focus configuration and a point focus configuration,
wherein:
in the line focus configuration, the anode target and the cathode filament are operable to generate a line-shaped X-ray beam; and
in the point focus configuration, the anode target and the cathode filament are operable to generate a point-shaped X-ray beam.

In accordance with one aspect, there is provided a method for producing an X-ray beam with an X-ray source of an X-ray diffraction apparatus, wherein the X-ray source includes an outer housing and an inner housing rotatably mounted to the outer housing, the inner housing enclosing a vacuum chamber, the vacuum chamber enclosing an anode target and a cathode filament operable to generate an X-ray beam, the method including:
selecting between a line focus configuration and a point focus configuration;
providing a relative rotation between the inner housing and the outer housing to achieve the selected line focus configuration or point focus configuration; and
operating the anode target and the cathode filament to generate the X-ray beam according to the selected line focus configuration or point focus configuration.

In some embodiments, the method further includes mounting the X-ray source to the X-ray diffraction apparatus.

In some embodiments, the method further includes:
  selecting another one of the line focus configuration and the point focus configuration;
  providing a subsequent relative rotation between the inner housing and the outer housing to achieve a subsequent line focus configuration or point focus configuration; and
  operating the anode target and the cathode filament to generate the X-ray beam according to the subsequent line focus configuration or point focus configuration.

Other features will be better understood upon reading of embodiments thereof with reference to the appended drawings.

DETAILED DESCRIPTION

Figure 1:
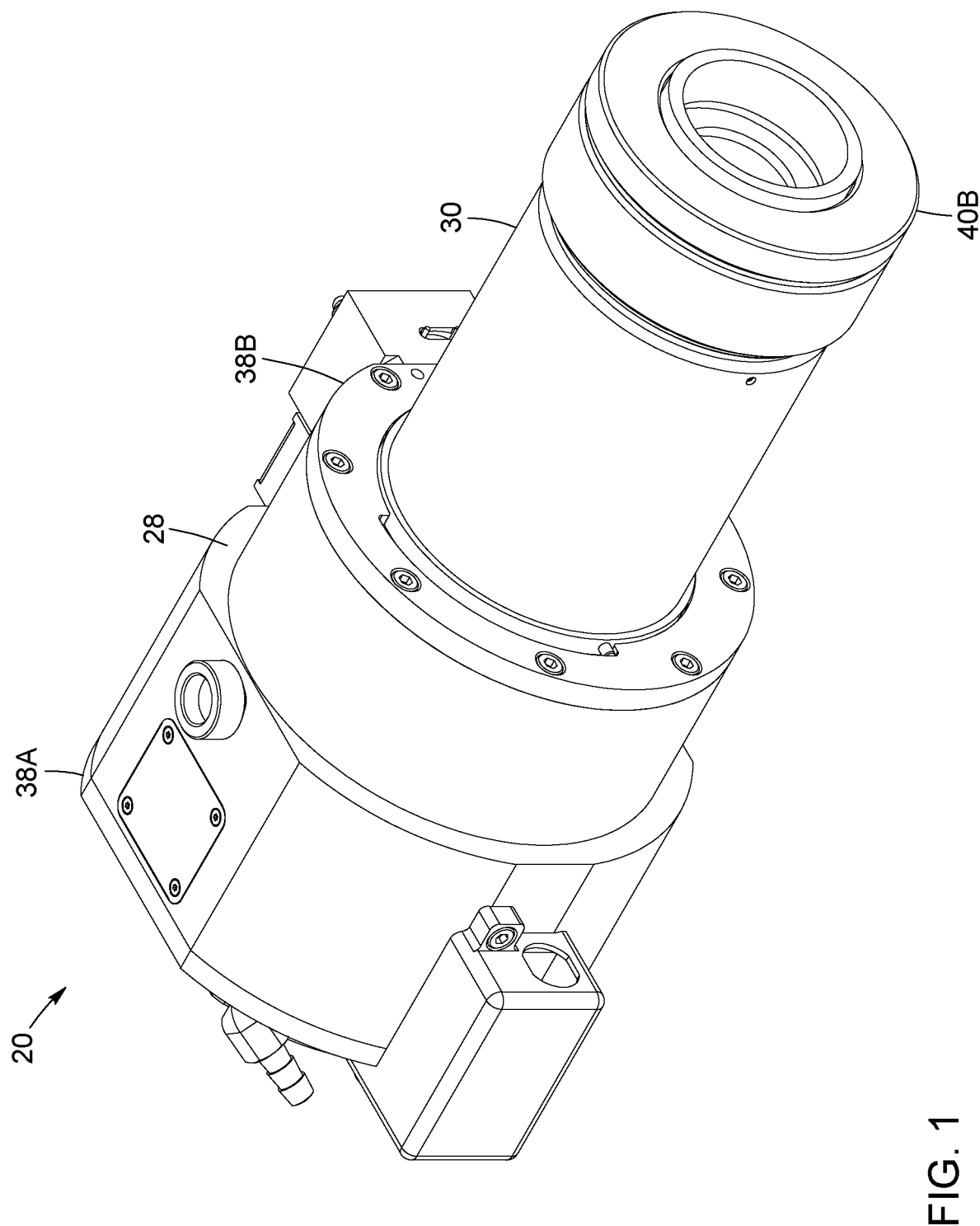
FIGS. 1 and 1a each illustrate a perspective view of an X-ray source for an X-ray diffraction apparatus, in accordance with one embodiment.

In the following description, similar features in the drawings have been given similar reference numerals. In order to not unduly encumber the figures, some elements may not be indicated on some figures if they were already mentioned in preceding figures. It should also be understood herein that the elements of the drawings are not necessarily drawn to scale, and that the emphasis is instead being placed upon clearly illustrating the elements and structures of the present embodiments.

The terms "a", "an" and "one" are defined herein to mean "at least one", that is, these terms do not exclude a plural number of items, unless stated otherwise. Terms such as "substantially", "generally" and "about", that modify a value, condition or characteristic of a feature of an exemplary embodiment, should be understood to mean that the value, condition or characteristic is defined within tolerances that are acceptable for the proper operation of this exemplary embodiment for its intended application. Moreover, it will be appreciated that positional descriptions such as "top", "bottom", "under", "left", "right", "front", "rear", "adjacent", "opposite", "parallel", "perpendicular", "inner", "outer", "internal", "external", and the like should, unless otherwise indicated, be taken in the context of the figures and should not be considered limiting.

The terms "light" and "optical", and variants and derivatives thereof, are used to refer to radiation in any appropriate region of the electromagnetic spectrum. The terms "light" and "optical" are therefore not limited to visible light, but can also include, without being limited to, the ultraviolet region and the infrared region of the electromagnetic spectrum. More specifically, in the context of the current disclosure, the terms "X-ray", "X-radiation", "light", "electromagnetic radiation", "optical", "spectral profile" "spectral waveband", derivatives and variants thereof, are used to refer to radiation in any appropriate region of the electromagnetic spectrum. By way of example, the X-rays may cover or substantially correspond to wavelengths ranging from 0.01 to 10 nanometers (i.e., frequencies in the range of 30 petahertz to 30 exahertz), which may be of particular interest for applications in the materials science industry for investigating the structural (e.g., atomic structure) or mechanical (e.g., residual stress) properties of samples. Also, the skilled person will appreciate that the definition of the spectral ranges, as well as the dividing lines between them, may vary depending on the technical field or the definitions under consideration, and are not meant to limit the scope of applications of the present techniques.

The terms "sample", "sample under investigation", "material", "analyzed sample", "powder", "thin films", derivatives and variants thereof are used to refer to a quantity of matter extracted or taken apart from a larger amount for analysis, or may refer to matter that is either natural (e.g., a specific chemical element found in nature), synthesized (e.g., a reaction of chemical compounds), or man-made (e.g., a powder formed by scratching a thin film). It will be understood that the sample intrinsically has various physical and chemical properties, which may be assessed using different instruments and methods (e.g., XRD analysis).

The terms "diffractometer", "X-ray diffraction apparatus", "XRD diffraction system", "powder diffraction instruments", "X-ray apparatus", derivatives and variants thereof refer to an apparatus configured to acquire patterns obtained by recording the intensities of X-rays scattered by the sample under investigation at different angles between an incident beam (i.e., X-ray beam incident on the sample) and a scattered beam (also referred to as a "diffracted beam", a "reflected beam", or any other similar expressions). The acquired patterns are typically representative of given properties (e.g., structure) of the material to be inspected. The above-mentioned apparatus could further be understood as a device configured to sense and/or probe x-rays scattered and/or reflected by the surface to be inspected, according to the needs of a particular application. It will be understood that different attachments (also referred to as "external device", e.g., different kinds of sample holders or the like) may be attached to the XRD apparatus.

The XRD apparatus may include an X-ray source (including, for example, a vacuum-sealed X-ray tube or incorporated into a high flux source such as a synchrotron, liquid metal jet, or any other, or any neutron source), an X-ray generator delivering high tension current to the X-ray source, a sample holder to hold the sample to be investigated, an X-ray detector capable of detecting X-ray and/or X-ray photons scattered by the sample and an X-ray optical assembly (typically used for collimating, conditioning, or focusing the X-rays at the detector). The XRD pattern is obtained by recording the intensities of X-rays scattered by the sample at different angles between the beam incident on the sample and beam scattered by the sample.

Unless stated otherwise, the terms "connected" and "coupled", and derivatives and variants thereof, refer herein to any structural and/or functional connection or coupling, either direct or indirect, between two or more elements. For example, the connection or coupling between the elements may be acoustical, mechanical, optical, electrical, logical, or any combination thereof.

The following description generally relates to techniques, apparatuses, and methods for X-ray diffraction (XRD) experiments in which it may be useful to switch or alternate between a line focus configuration and a point focus configuration. Such a need for the line focus configuration and the point focus configuration may arise, for example and without being limitative, from the samples to be characterized or some of their properties (e.g., state and/or composition). In the context of this disclosure, the expressions "line focus configuration" and "point focus configuration" refer to the profile of the X-ray beam in a reference plane. The reference plane may be a plane substantially parallel to the sample's surface or a plane coinciding with the sample's surface. In practice, the X-ray beam intersects or reaches the sample's surface, and the profile of the X-ray beam may be determined at the sample's surface or in a plane parallel to the sample's surface. In the case of the "line focus configuration", the shape or profile of the X-ray beam in the reference plane is a line or is substantially similar to a line, i.e., a generally elongated shape having a dimension (e.g., a length) greater than another dimension (e.g., width). In the case of the "point focus configuration", the shape or profile of the X-ray beam in the reference plane is a point. It will be noted that the point may be substantially circular but could also have other shapes. In some embodiments, the shape of the X-ray beam at the sample's surface may have a dimension (e.g., a length) comparable to another dimension (e.g., a width).

The technology and its advantages will become more apparent from the detailed description and examples that follow, which present the various embodiments of the technology. More particularly, the following sections of the description will present different embodiments of an X-ray source for an XRD apparatus, an XRD apparatus, as well as related methods.

Figure 7:
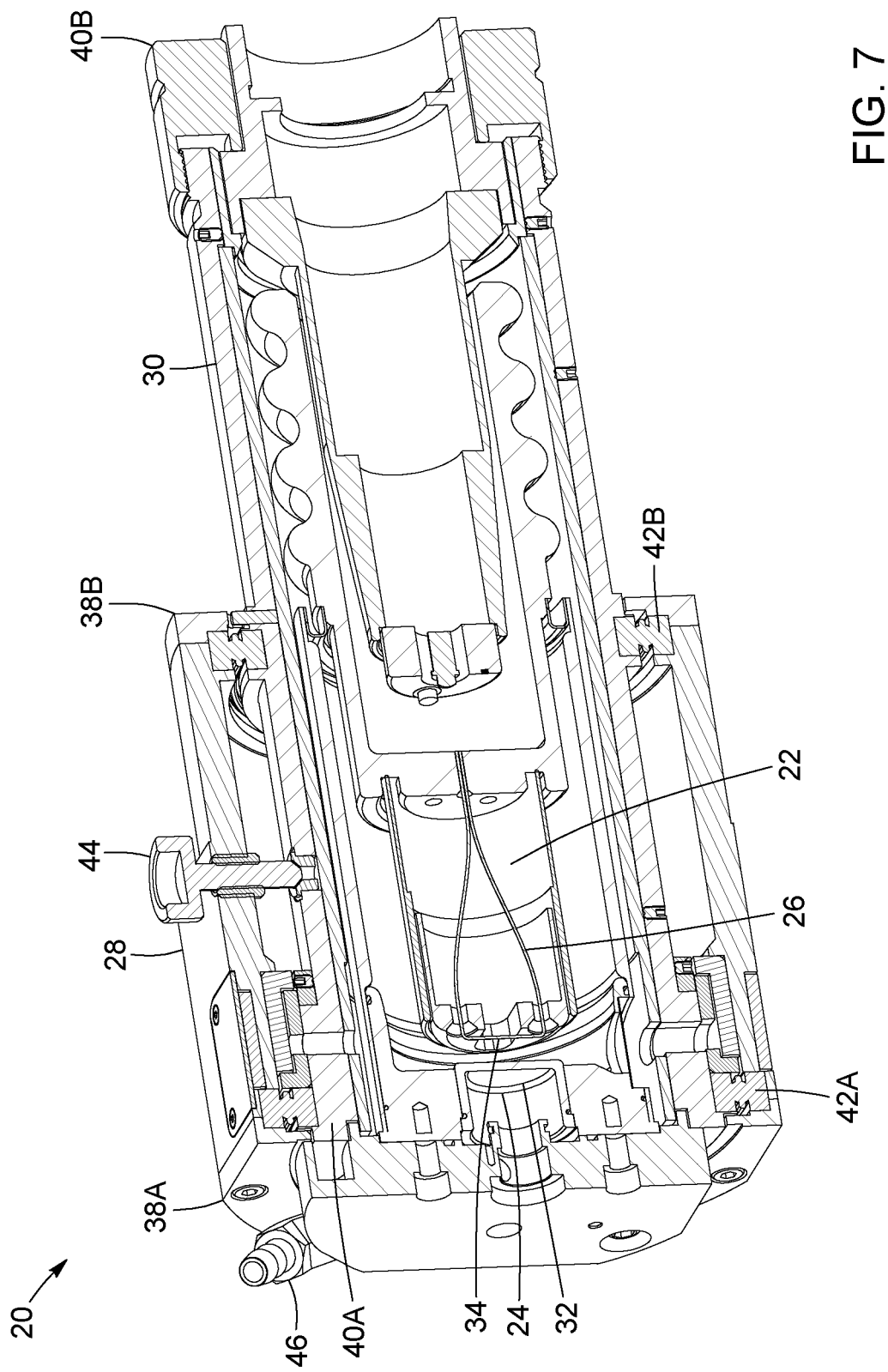
FIGS. 7 and 7a each illustrate a cross-section of the X-ray source illustrated in FIG. 6, taken along the line 7-7 and the line 7A-7a, respectively.
Figure 7A:
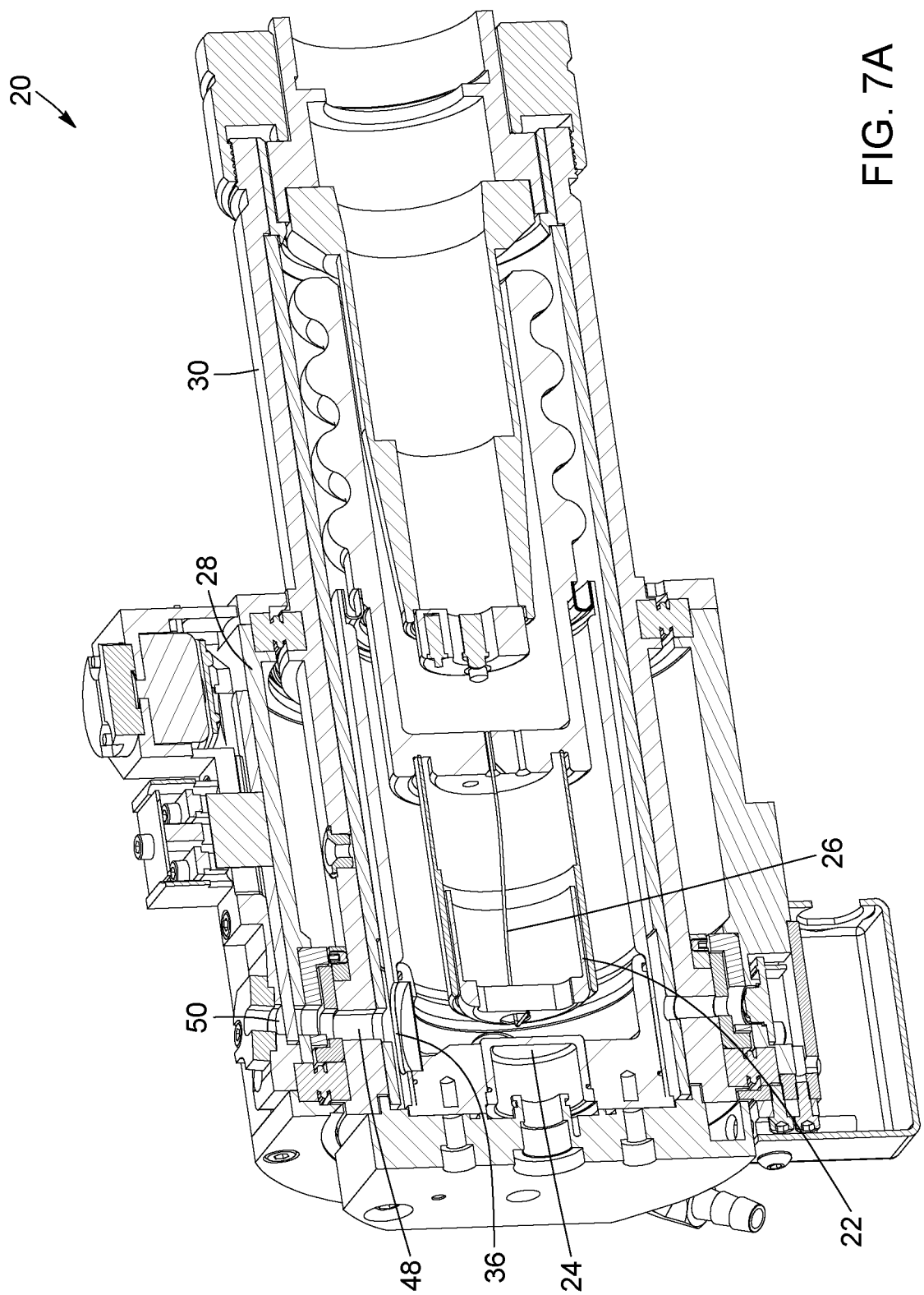
Figure 8:
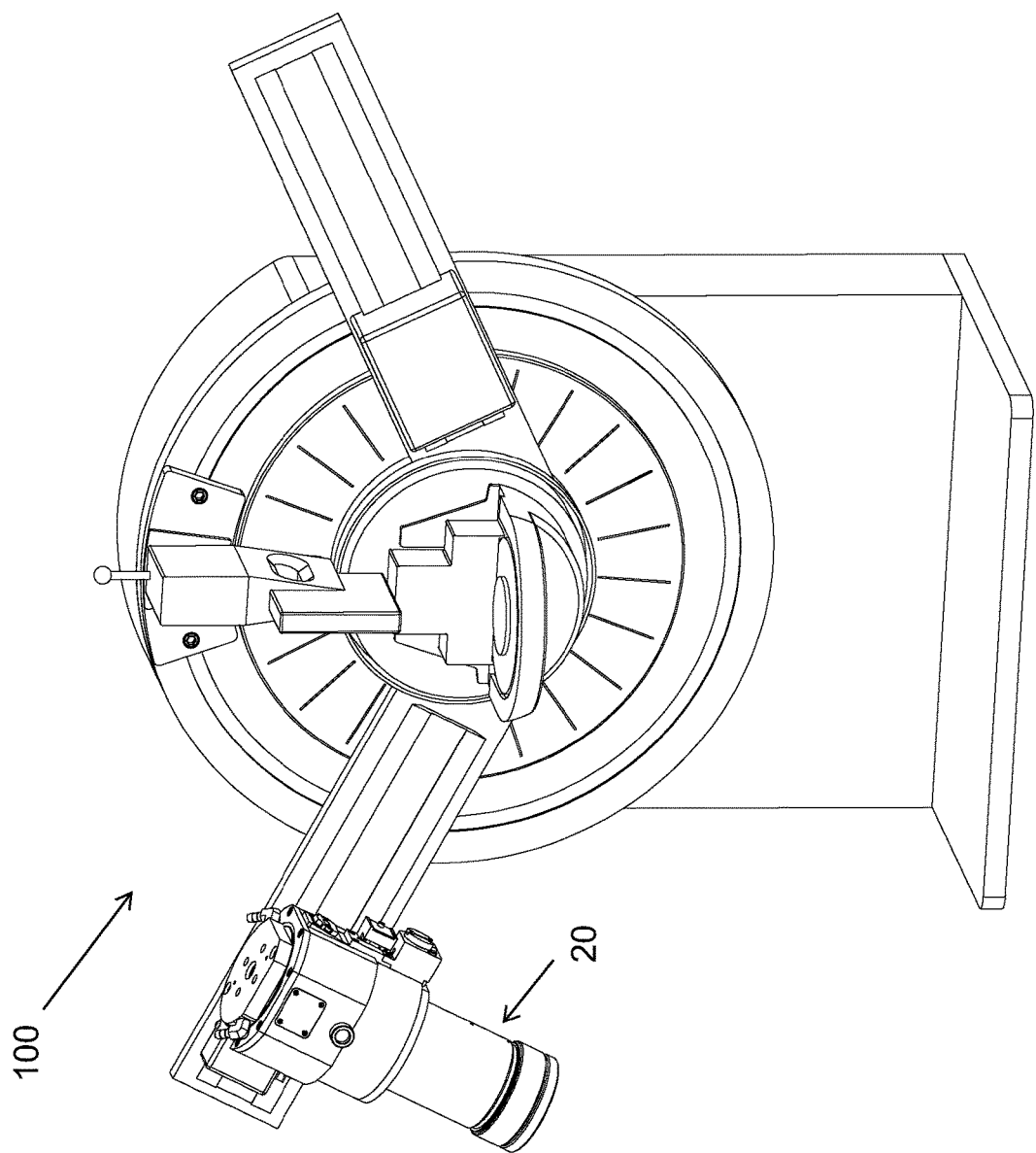
FIG. 8 is a perspective view of an X-ray diffraction apparatus, in accordance with one embodiment.

With reference to FIGS. 1 to 7A, there is shown an embodiment of an X-ray source 20 for an XRD apparatus (not shown in FIGS. 1 to 7A but illustrated in FIG. 8). The X-ray source 20 broadly includes a vacuum chamber 22, an anode target 24, a cathode filament 26, an outer housing 28, and an inner housing 30.

The vacuum chamber 22 encloses the anode target 24 and the cathode filament 26, i.e., the anode target 24 and the cathode filament 26 are housed or contained within a vacuum provided inside the vacuum chamber 22. The vacuum chamber 22 may be, for example and without being limitative, made from glass or a similar material. The vacuum provided within the vacuum chamber 22 allows electrons flowing from the cathode filament 26 to the anode target 24 without encountering gas atoms, which generally leads to a more efficient generation of X-rays.

Figure 5:
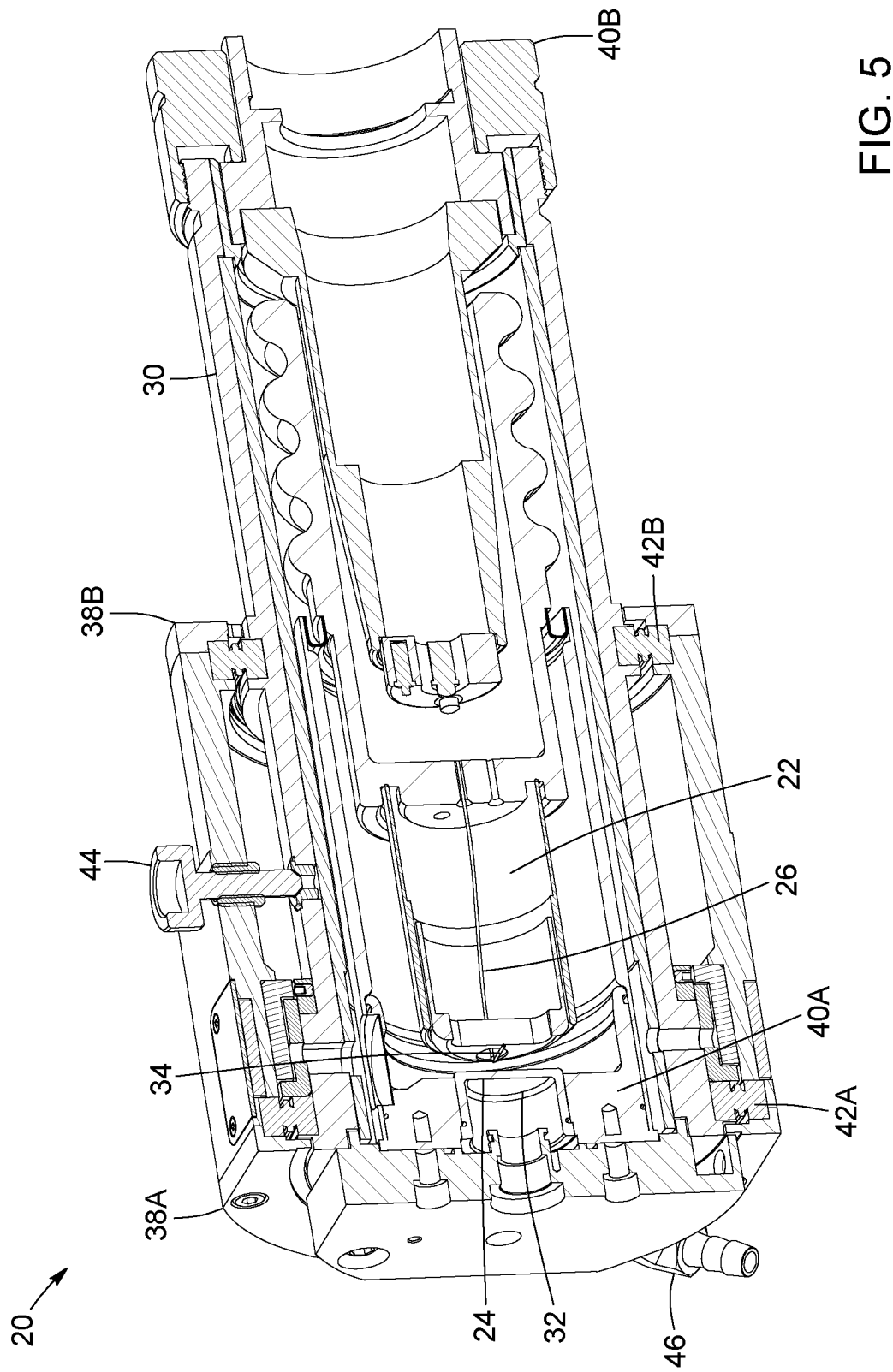
FIGS. 5 and 5a each illustrate a cross-section of the X-ray source illustrated in FIG. 4, taken along the line 5-5 and the line 5A-5A, respectively.
Figure 5A:
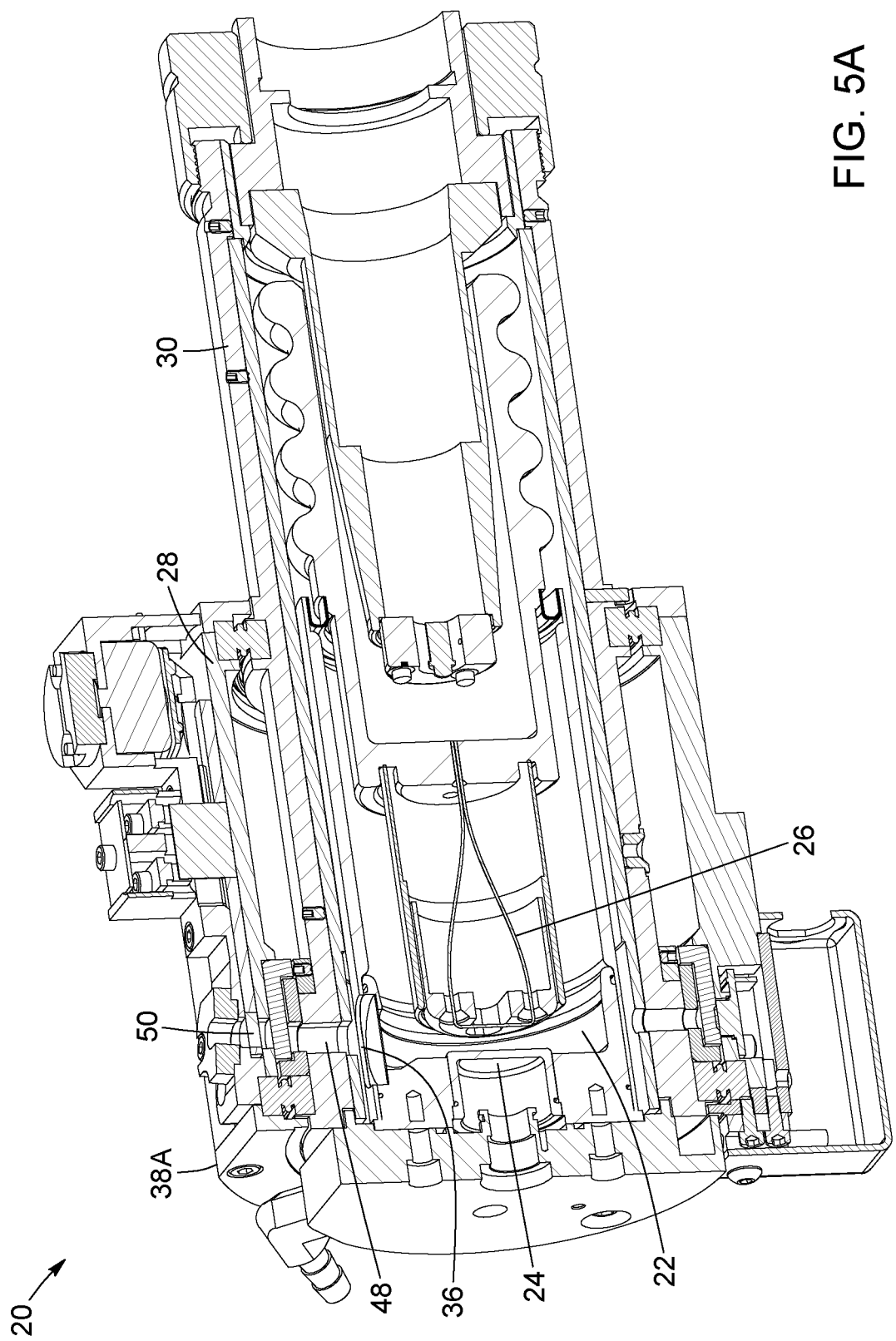
Figure 6:
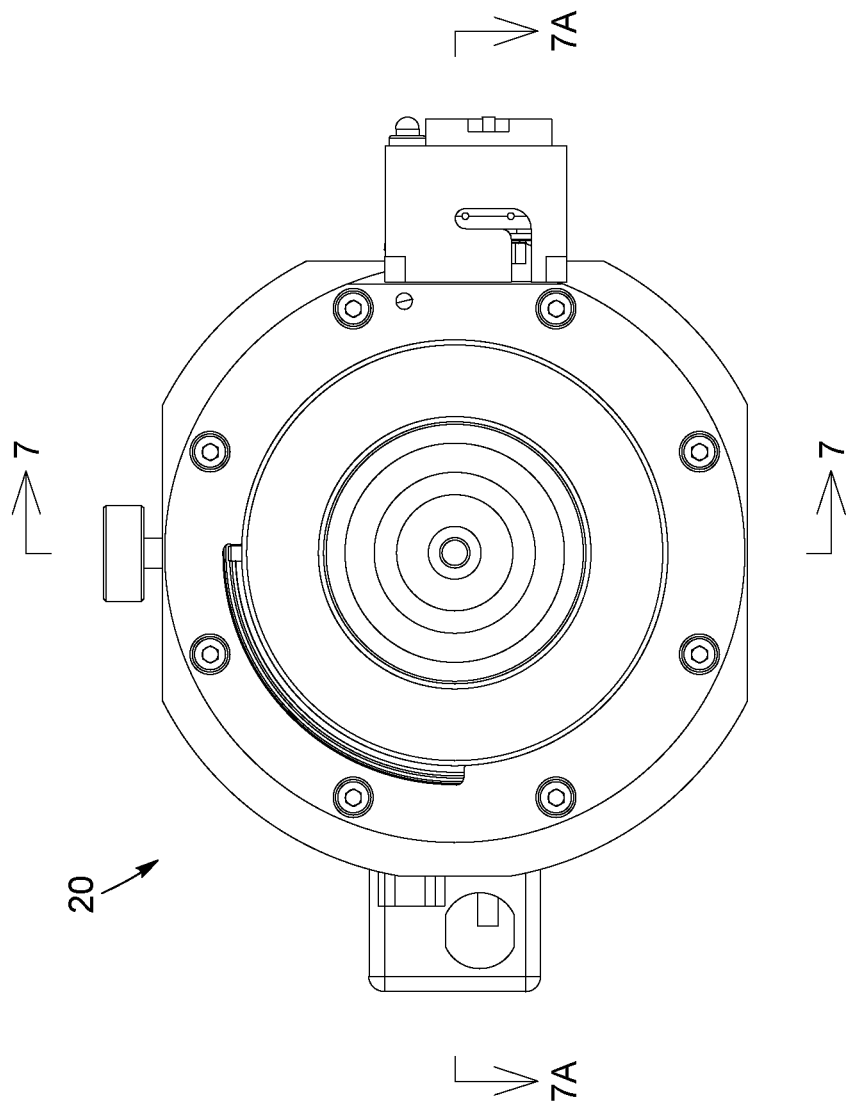
FIG. 6 is a bottom view of the X-ray source according to the embodiment illustrated in FIG. 1, wherein an inner housing of the X-ray source is in a point focus configuration.

As better illustrated in FIGS. 5A and 7A, the vacuum chamber 22 has a window 36 transparent to the X-ray beam. The expression "transparent" refers to the optical properties of the window 36, and more specifically means that the spectral profile or at least some characteristics of the X-ray beam are substantially unaffected or remain substantially the same after its passage therethrough.

In the illustrated embodiment, the anode target 24 is embodied by a relatively flat and circular disc 32 and the cathode filament 26 has an elongated body 34. The cathode filament 26 may be made from a material having a relatively high melting point, such as, for example and without being limitative, a metal. In some embodiments, the cathode filament 26 is made from a wound coil of wire.

The anode target 24 and the cathode filament 26 are collectively operable to generate an X-ray beam. The cathode filament 26 is configured to produce or generate electrons, which will later be accelerated towards the anode target 24. More specifically, an electric current is passed through the cathode filament 26, which raises the temperature of the cathode filament 26 until some of the electrons have enough thermal energy to be extracted from the cathode filament 26. As such, the electrons are thermionically emitted from the cathode filament 26, i.e., according to the thermionic emission phenomenon. Of note, the cathode filament 26 is generally negatively charged, and the anode target 24 is generally positively charged.

In operation, a relatively high voltage is applied between the anode target 24 and the cathode filament 26. The relatively high voltage may either be constant (i.e., maintained), or ramped (i.e., varied, increased and/or decreased). The electric field generated between the cathode filament 26 and the anode target 24 accelerates the electrons towards the anode target 24.

The anode target 24 is configured to convert the accelerated electrons emitted from the cathode filament 26 into X-rays. The X-rays having been produced from the anode target 24 are collectively referred to as the "X-ray beam" in the context of the current disclosure. More specifically, the electrons generated by the cathode filament 26 are decelerated upon colliding with the anode target 24, which in turn produces the X-ray beam and heat. Of note, the heat generated by the anode target 24 may be dissipated with a cooling mechanism which will be described later. The anode target 24 may also be rotated about its center to facilitate the thermal dissipation. The material forming the anode target 24 may be selected according to the X-ray spectrum to be achieved, which may be, for example and without being limitative, dictated by a targeted application. Nonlimitative examples of the material forming the anode target are chromium, cobalt, copper, molybdenum, silver, and tungsten.

In some embodiments, a filter (not shown in the Figures) may be used to absorb low energy X-ray photons. The filter may be embodied by a relatively thin sheet of aluminium positioned near the anode target 24, for example and without being limitative between the anode target 24 and the window 36. The filter may be useful, for example and without being limitative, to condition the X-ray beam. A nonlimitative example of conditioning of the X-ray beam includes spectrally filtering some unwanted wavelengths or reducing the intensity of particular wavelengths of the spectral profile of the X-ray beam.

Figure 1A:
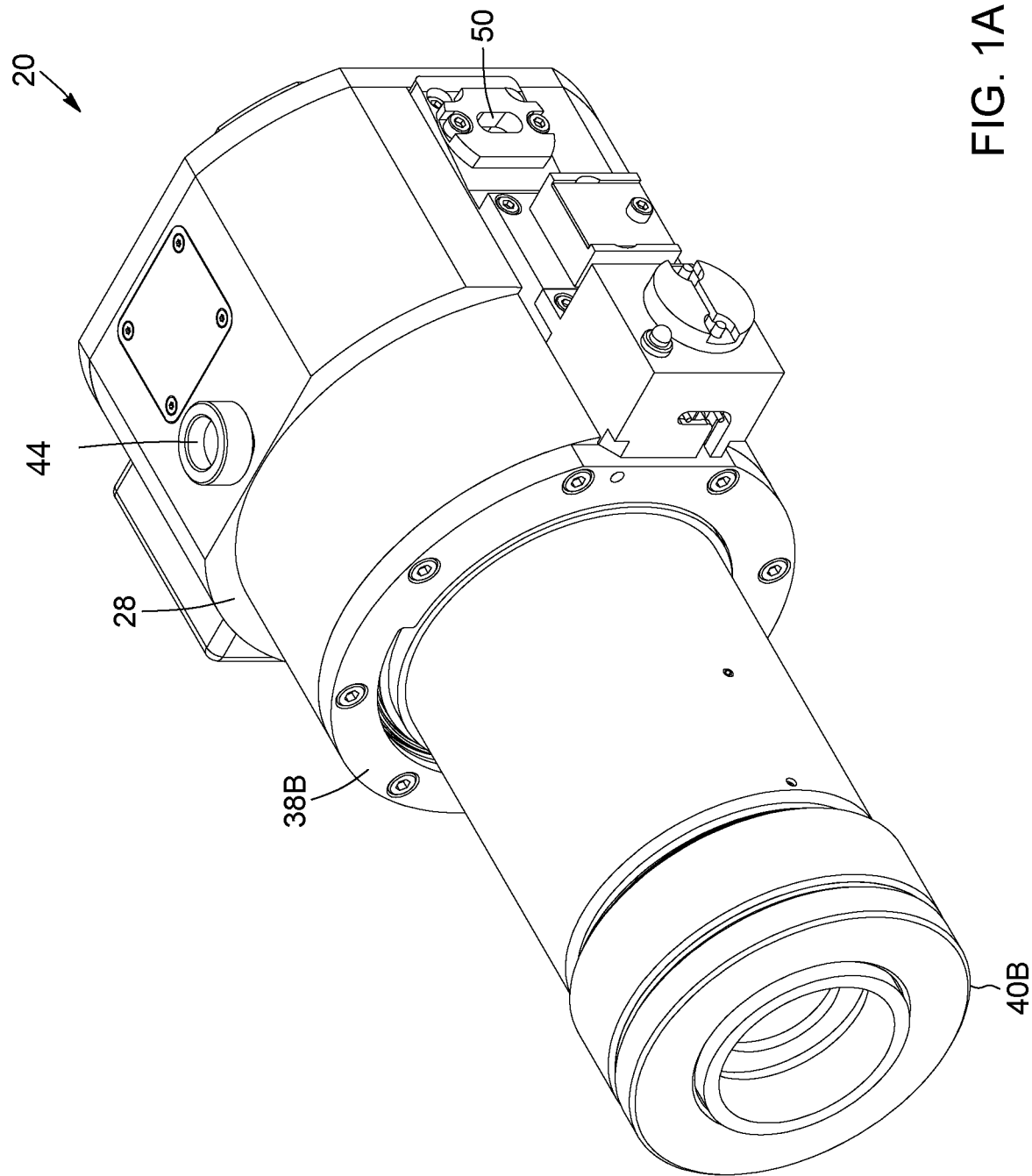
Figure 2:
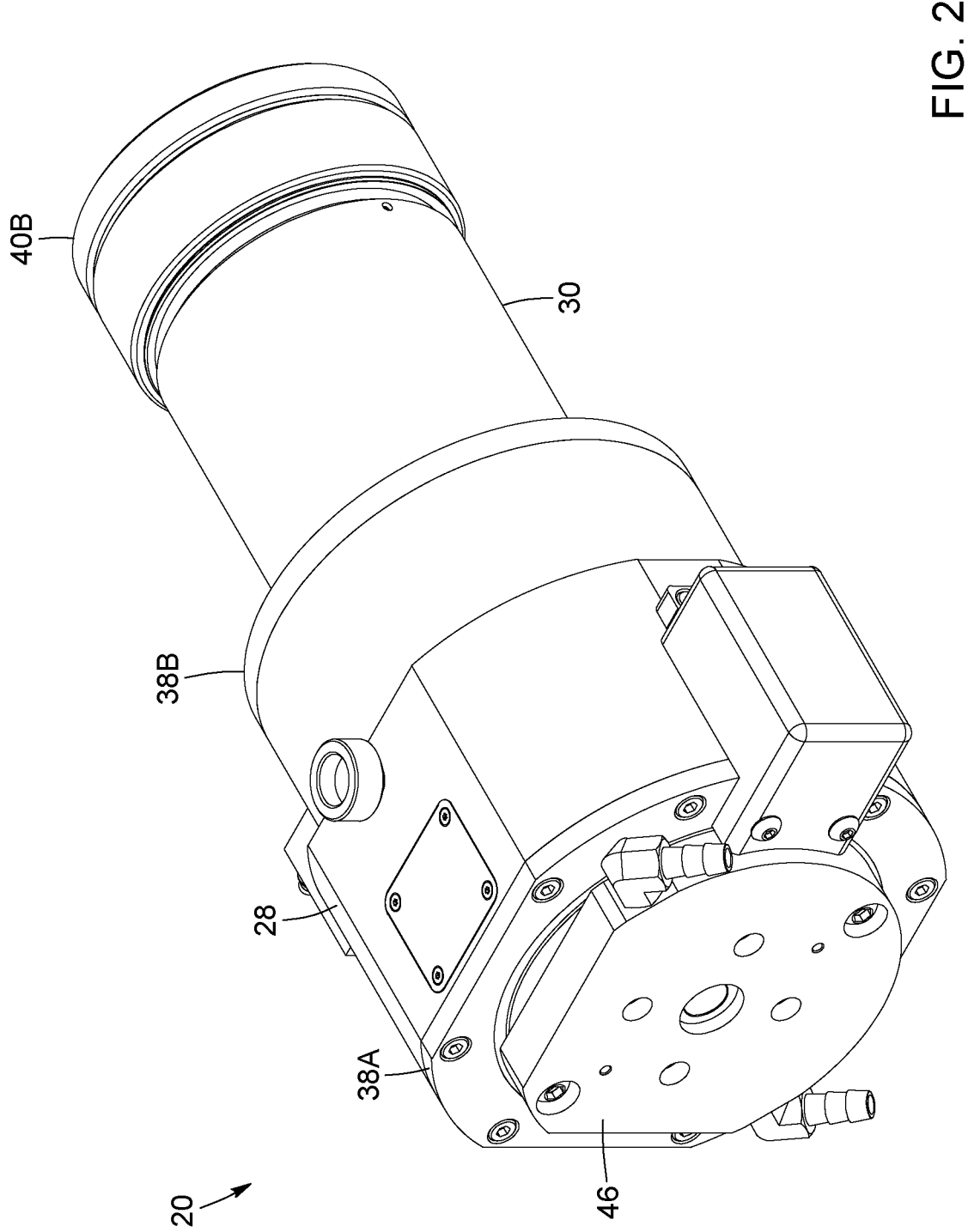
FIG. 2 is another perspective view of the X-ray source according to the embodiment illustrated in FIG. 1.

The outer housing 28 is mountable to the XRD apparatus (not shown in the Figures) in a fixed position. In the context of the current description, the expression "fixed position" means that once the outer housing is mounted to the XRD apparatus, or a portion thereof, such as, for example, a goniometer, the relative position of the outer housing 28 does not change with respect to the XRD apparatus or a portion thereof. In other words, a relative movement between the outer housing 28 and the XRD apparatus is substantially blocked or substantially immobile along one or more planes. When the X-ray source 20 is mounted to the XRD apparatus, the X-ray beam is generally aligned with a center of the goniometer (or another portion of the XRD apparatus) in the fixed position. As better illustrated in FIGS. 1A, 3A and 5A, the outer housing 28 includes outer housing openings 50.

The inner housing 30 is rotatably mounted to the outer housing 28 and encloses the vacuum chamber 22, the vacuum chamber notably enclosing the cathode filament 26. The inner housing 30 is rotatable with respect to the outer housing 28 between a line focus configuration and a point focus configuration. As better illustrated in FIGS. 3A and 5A, the inner housing 30 includes outer housing openings 48.

Upon rotation of the inner housing 30 with respect to the outer housing 28, the cathode filament 26 is engaged in rotation therewith, while the outer housing 28 remains in the fixed position. In other words, a relative rotation may be provided between the outer housing 28 and the inner housing 30.

As better seen in FIGS. 7 and 7A, in the line focus configuration, the elongated body 34 of the cathode filament 26 is substantially parallel to the window 36, thereby producing a line-shaped X-ray beam. More specifically, the window 36 and the elongated body 34 of the cathode filament 26 extend in two parallel planes. One would note that the projection of the elongated body 34 of the cathode filament 26 through the window 36 is or resembles a line.

Now referring back to FIGS. 5 and 5A, in the point focus configuration, the elongated body 34 of the cathode filament 26 is substantially perpendicular to the window 36, thereby producing a point-shaped X-ray beam. More specifically, the window 36 and the elongated body 34 of the cathode filament 26 extend in two perpendicular or normal planes. One would note that the projection of the elongated body 34 of the cathode filament 26 through the window 36 is or resembles a point.

In the embodiments illustrated in FIGS. 4 to 7A, the line focus configuration and the point focus configuration are 90° apart from another, meaning that a relative rotation of 90° between the outer housing 28 and the inner housing 30 permits switching between the line focus configuration and the point focus configuration (and vice-versa). It will be noted that the angle between the two configurations may slightly vary from 90°.

The configuration of the outer housing 28 and the inner housing 30 allows avoiding the removal of the vacuum tube, dismantlement of the vacuum tube, realignment of the vacuum tube position, important rearrangement of the X-ray source and/or alignment of the X-ray beam to the center of the goniometer (or any other portions of the XRD apparatus to which the X-ray source is mounted). As such, switching between the line focus configuration and the point focus configuration using the X-ray source 20 is generally less time-consuming than existing techniques.

As illustrated in FIGS. 1 to 7A, the outer housing 28 and at least a portion of the inner housing 30 are concentric. For example, and without being limitative, the outer housing 28 and the inner housing 30 may be cylindrical, and a portion of the cylindrical inner housing 30 may be provided within the outer housing 28. Of course, it will be readily understood that the shape, dimension(s) and interlocking of the outer housing 28 and the inner housing 30 may vary.

In some embodiments, the outer housing 28 may comprise two outer housing ends 38A,B, each outer housing end 38A,B being opposite one from another. The inner housing may also comprise two inner housing ends 40A,B, each inner housing end 40A,B being opposite one from another. In these embodiments, at least one of the two inner housing ends 40A,B is mechanically engaged with a corresponding one of the two outer housing ends 38A,B. As such, one of the outer housing ends 38A,B, e.g., the outer housing end 38A, may extend in the same plane as one of the inner housing ends 40A,B, e.g., the inner housing 40A, and the other one of the outer housing ends 38A,B, e.g., the outer housing end 38B, may extend in the same plane as one of the inner housing ends 40A,B, e.g., the inner housing 40B, may extend in two different, yet parallel planes.

In some embodiments, the X-ray source 20 includes a rotation mechanism mechanically engaging at least one of the two inner housing ends 40A,B with the corresponding one of the two housing ends 38A,B. For example, and without being limitative, the rotating mechanism may include at least one bearing.

In one embodiment, the rotation mechanism includes a pair of bearings 42A,B. A first bearing 42A may contact an inner periphery of the outer housing 28 at a first one of the two outer housing ends 38A,B and an outer periphery of the inner housing 30 at a first one of the two inner housing ends 40A,B. A second bearing 42B may contact the inner periphery of the outer housing 28 at a second one of the two outer housing ends 38AB and the outer periphery of the inner housing 30 at a predetermined position. It will be noted that the predetermined position may be a second one of the two inner housing ends 40A,B. Alternatively, the predetermined position may be located between the first one of the two inner housing ends 40A,B and a second one of the two inner housing ends 40A,B.

In some embodiments, the X-ray source 20 includes a locking mechanism for blocking the inner housing 30 in one of the line focus configuration and the point focus configuration. The locking mechanism may pass through a portion of the outer housing 28 and the inner housing 30, thereby locking or blocking a relative movement or rotation of the inner housing 30 with respect to the outer housing 28. The locking mechanism may be embodied by a screw (see the screw 44 on FIG. 1A), or any similar component(s) or device(s) that allow blocking a relative movement between the outer housing 28 and the inner housing 30. For example, the locking mechanism could be embodied or could include pins, spring pins and/or electromagnets.

Figure 3:
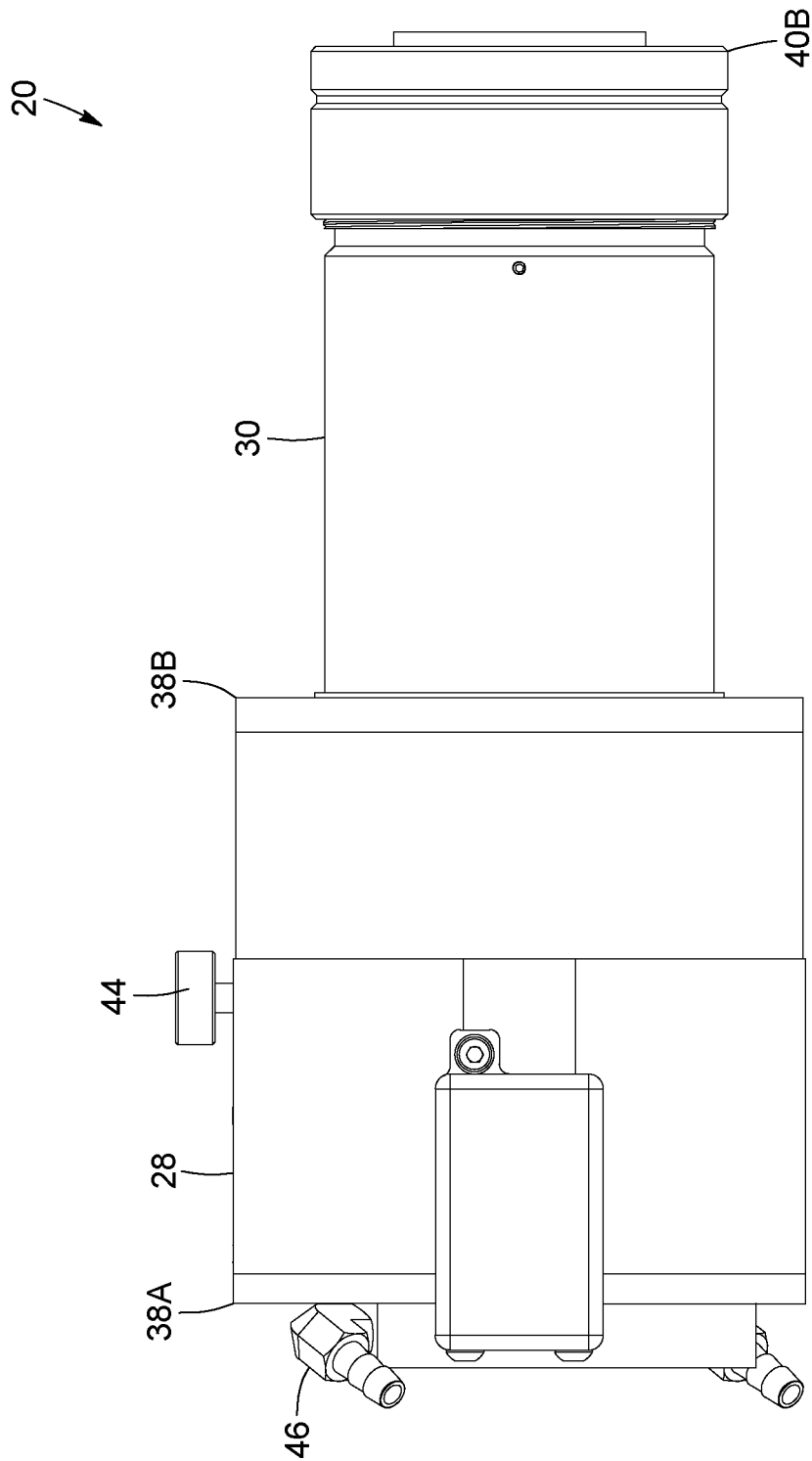
FIGS. 3 and 3a are respectively a back view and a front view of the X-ray source according to the embodiment illustrated in FIG. 1.
Figure 3A:
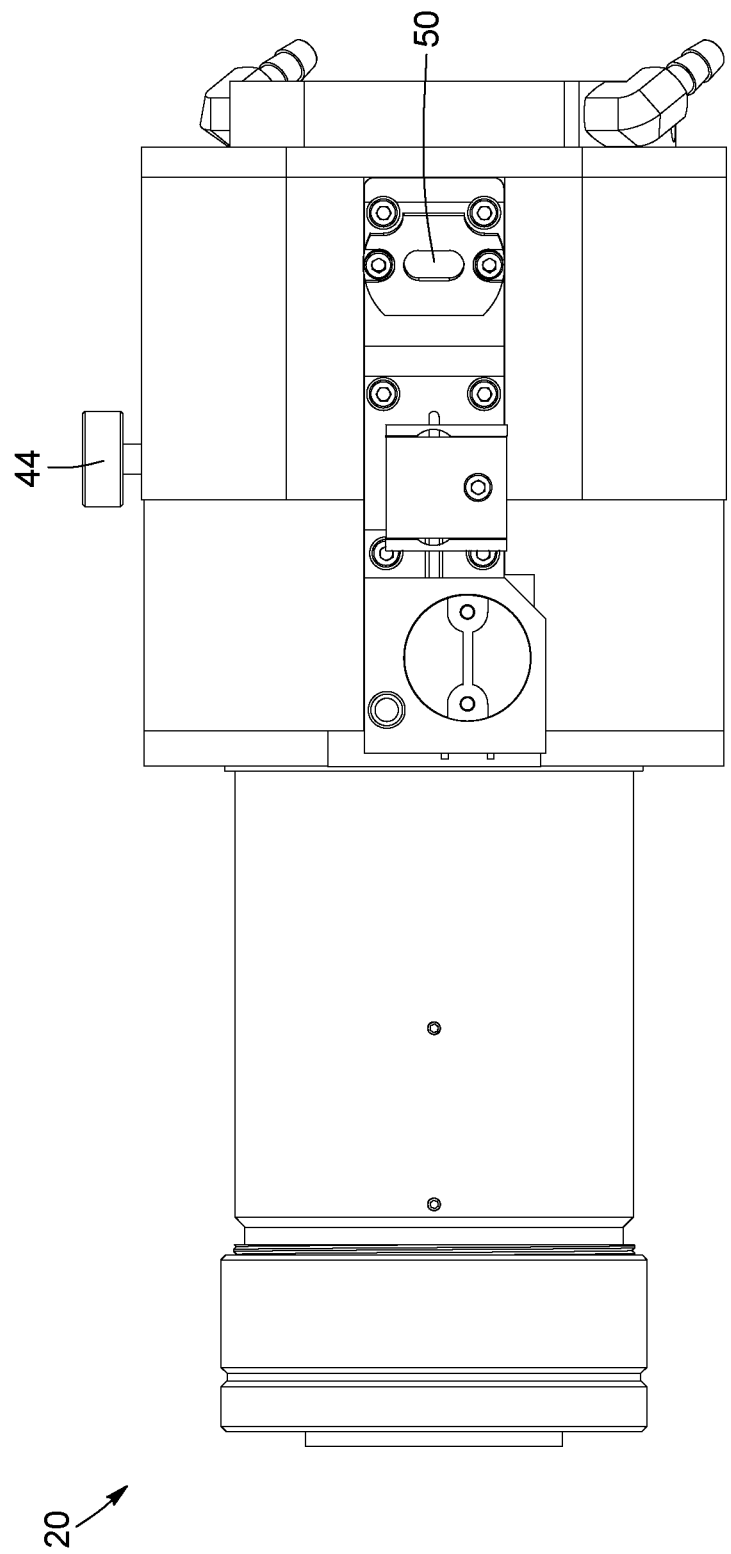
Figure 4:
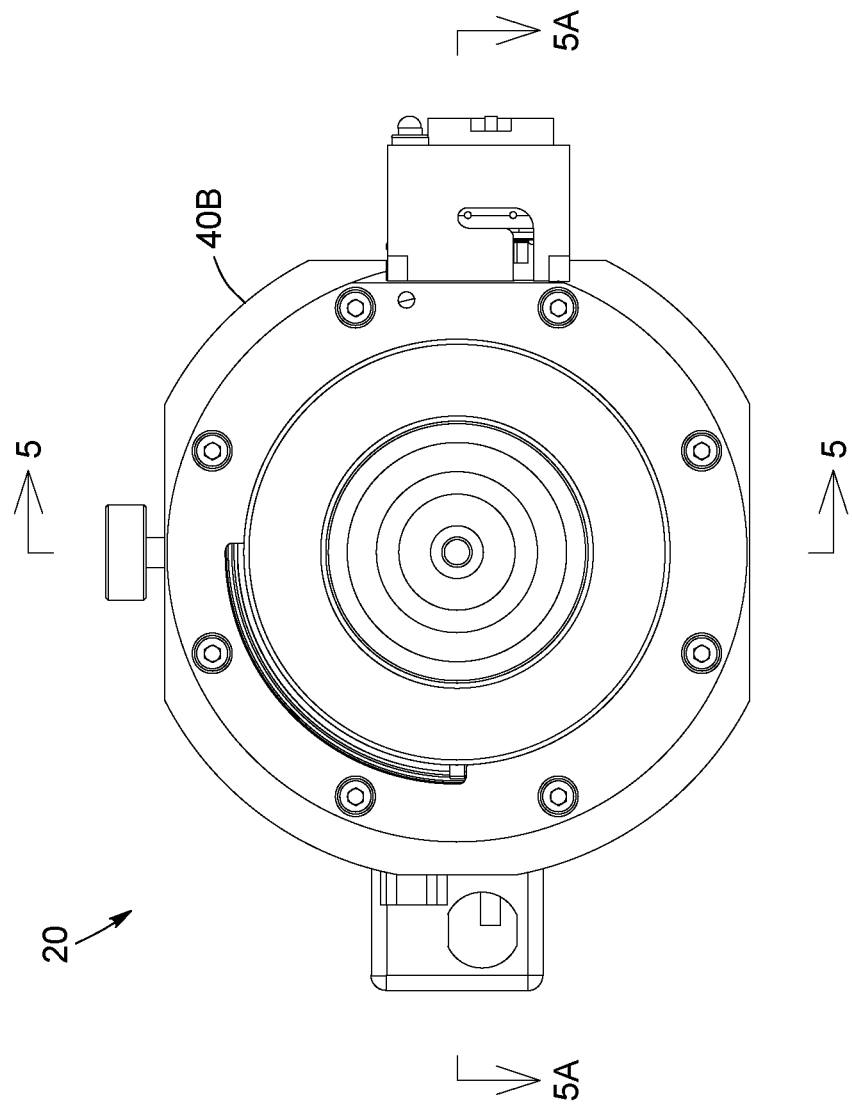
FIG. 4 is a bottom view of the X-ray source according to the embodiment illustrated in FIG. 1, wherein an inner housing of the X-ray source is in a line focus configuration.

In some embodiments, such as the one illustrated in FIGS. 3, 5 and 7, the X-ray source 20 may include a heat transfer channel 46 in thermal contact with the anode target 24. The heat transfer channel 46 is configured for receiving and circulating a heat transfer fluid therein, which may assist in dissipating the heat generated by the anode target 24. The heat transfer fluid circulating in the heat transfer channel 46 may be gaseous, liquid or two-phased, depending on the cooling requirements. Non limitative examples of heat transfer fluids are distilled water, glycol solution, antifreeze, or any combinations thereof.

In some embodiments, the X-ray source 20 may include a heat sink (not illustrated), rather than a heat transfer channel 46. In these embodiments, the heat sink is in thermal contact with the anode target 24 and may include a plurality of spaced-apart pins or fins. Such pins or fins are generally made from a thermally conductive material. It will be noted that the heat sink may be coupled with one or more fans to produce an airflow and promoting the heat dissipation away from the anode target 24.

In accordance with another aspect, there is also provided an X-ray source for an X-ray diffraction apparatus, including a vacuum chamber having a window, an anode target and a cathode filament similar to the ones having been previously described. The X-ray source includes an outer housing having outer housing apertures and an inner housing having inner housing aperture. The outer housing is mountable to the XRD apparatus. The inner housing is rotatably mounted to the outer housing and enclosing the vacuum chamber. The expression "rotatably mounted" herein to the mechanical connection between the inner housing and the outer housing allowing a relative movement, and more specifically a relative rotation, between the inner housing and the outer housing. The X-ray source according to this aspect includes a rotation mechanism in engagement with the outer housing and the inner housing. The rotation mechanism is operable to provide a relative rotation between the inner housing and the outer housing, thereby rotating between a line focus configuration and a point focus configuration In accordance with another aspect, and with reference to FIG. 8, there is also provided an XRD apparatus 100. The XRD apparatus 100 includes an X-ray source for irradiating a sample with an X-ray beam. The X-ray source may be embodied by the X-ray source 20 which has been previously described. The XRD apparatus 100 also includes a sample holder for holding the sample, the sample being positioned to receive the X-ray beam when held by the sample holder. The XRD apparatus 100 also includes a detector for receiving X-rays scattered from the sample and outputting an X-ray diffraction pattern therefrom. As it has been previously described, the XRD apparatus 100 may include other components, modules and assemblies known from the person skilled in the art.

In some embodiments, the XRD apparatus 100 also includes a motor assembly in driving engagement with the inner housing. The motor assembly, which may be embodied by one or more motors, is operable to provide the rotation between the inner housing and the outer housing.

In some embodiments, the XRD apparatus 100 may also include a controlling unit for controlling the motor assembly.

In accordance with another broad aspect, there is also provided a method for producing an X-ray beam. The method includes mounting an X-ray source to an X-ray diffraction apparatus 100. The X-ray source may be similar to the one having been previously described, i.e., the X-ray source includes an outer housing and an inner housing rotatably mounted to the outer housing. The inner housing encloses a vacuum chamber, and the vacuum chamber encloses an anode target and a cathode filament operable to generate an X-ray beam. The method also includes selecting between a line focus configuration and a point focus configuration. Once the selection between the line focus configuration and the point focus configuration is made, the method includes providing a relative rotation between the inner housing and the outer housing to achieve the selected line focus configuration or point focus configuration. After the relative rotation, the method includes a step of operating the anode target and the cathode filament to generate the X-ray beam according to the selected line focus configuration or point focus configuration. In some embodiments, the method may include selecting another one of the line focus configuration and the point focus configuration. For example, if the X-ray source is in the line focus configuration, the selected configuration may be the point focus configuration, and vice-versa. Once the configuration has been selected, the method may include subsequently providing a relative rotation between the inner housing and the outer housing to achieve a subsequent line focus configuration or point focus configuration. The method may also include operating the anode target and the cathode filament to generate the X-ray beam according to the subsequent line focus configuration or point focus configuration.

In accordance with another broad aspect, there is also provided a method for manufacturing the X-ray source 20 which has been herein described. The method includes a step of providing a vacuum chamber enclosing an anode target and a cathode filament. The method also includes a step of mounting the vacuum chamber within an inner housing. The method also includes a step of rotatably mounting the inner housing to an outer housing, the inner housing being rotatable with respect to the outer housing between a line focus configuration and a point focus configuration. This step of rotatably mounting the inner housing to the outer housing may be achieved using a rotation mechanism such as, for example and without being limitative, the ones having been previously described.

Several alternative embodiments and examples have been described and illustrated herein. The embodiments described above are intended to be exemplary only. A person skilled in the art would appreciate the features of the individual embodiments, and the possible combinations and variations of the components. A person skilled in the art would further appreciate that any of the embodiments could be provided in any combination with the other embodiments disclosed herein. The present examples and embodiments, therefore, are to be considered in all respects as illustrative and not restrictive. Accordingly, while specific embodiments have been illustrated and described, numerous modifications come to mind without significantly departing from the scope defined in the appended claims.

The invention claimed is:

1. An X-ray source for an X-ray diffraction apparatus, the X-ray source comprising:
   an anode target and a cathode filament, the cathode filament having an elongated body, the anode target and the cathode filament being operable to generate an X-ray beam;
   a vacuum chamber enclosing the anode target and the cathode filament, the vacuum chamber having a window transparent to the X-ray beam;
   an outer housing mountable to the X-ray diffraction apparatus in a fixed position, the outer housing comprising outer housing openings; and
   an inner housing enclosing the vacuum chamber and rotatably mounted to the outer housing, the inner housing comprising inner housing openings positioned to be aligned with the window and the outer housing openings, the inner housing being rotatable with respect to the outer housing between a line focus configuration and a point focus configuration,
   wherein, upon rotation of the inner housing with respect to the outer housing, the cathode filament is engaged in rotation therewith and the outer housing remains in the fixed position, such that:
   in the line focus configuration, the elongated body of the cathode filament is substantially parallel to the window, thereby producing a line-shaped X-ray beam; and
   in the point focus configuration, the elongated body of the cathode filament is substantially perpendicular to the window, thereby producing a point-shaped X-ray beam.

2. The X-ray source of claim 1, wherein the outer housing and at least a portion of the inner housing are concentric.

3. The X-ray source of claim 1, wherein:
   the outer housing comprises two outer housing ends, each outer housing end being opposite one from another; and
   the inner housing comprises two inner housing ends, each inner housing end being opposite one from another, at least one of the two inner housing ends being mechanically engaged with a corresponding one of the two outer housing ends.

4. The X-ray source of claim 3, further comprising a rotation mechanism mechanically engaging said at least one of the two inner housing ends with said corresponding one of the two housing ends.

5. The X-ray source of claim 4, wherein the rotation mechanism comprises at least one bearing.

6. The X-ray source of claim 4, wherein the rotation mechanism comprises:
- a first bearing contacting an inner periphery of the outer housing at a first one of the two outer housing ends and an outer periphery of the inner housing at a first one of the two inner housing ends; and
- a second bearing contacting the inner periphery of the outer housing at a second one of the two outer housing ends and the outer periphery of the inner housing at a predetermined position, the predetermined position being located between the first one of the two inner housing ends and a second one of the two inner housing ends.

7. The X-ray source of claim 1, wherein the outer housing is mountable to a goniometer of the X-ray diffraction, the X-ray beam being aligned with a center of the goniometer in the fixed position.

8. The X-ray source of claim 1, further comprising a locking mechanism for blocking the inner housing in one of the line focus configuration and the point focus configuration.

9. The X-ray source of claim 8, wherein the locking mechanism is selected from the group consisting of a screw, pins, spring pins and electromagnets.

10. The X-ray source of claim 1, further comprising a heat transfer channel in thermal contact with the anode target, the heat transfer channel being configured for receiving and circulating a heat transfer fluid therein.

11. The X-ray source of claim 10, wherein the heat transfer fluid is gaseous, liquid or two-phased.

12. The X-ray source of claim 10, wherein the heat transfer fluid is selected from the group consisting of distilled water, glycol solution, antifreeze, and any combinations thereof.

13. The X-ray source of claim 1, wherein the anode target is made from an anode target material selected from the group consisting of chromium, cobalt, copper, molybdenum, silver, and tungsten.

14. The X-ray source of claim 1, wherein the cathode filament is made from a material having a relatively high melting point.

15. An X-ray diffraction apparatus, comprising:
- an X-ray source for irradiating a sample with an X-ray beam, the X-ray source comprising:
  - an anode target and a cathode filament, the cathode filament having an elongated body, the anode target and the cathode filament being operable to generate the X-ray beam;
  - a vacuum chamber enclosing the anode target and the cathode filament, the vacuum chamber having a window transparent to the X-ray beam;
  - an outer housing mountable to the X-ray diffraction apparatus in a fixed position, the outer housing comprising outer housing openings; and
  - an inner housing enclosing the vacuum chamber and rotatably mounted to the outer housing, the inner housing comprising inner housing openings positioned to be aligned with the window and the outer housing openings, the inner housing being rotatable with respect to the outer housing between a line focus configuration and a point focus configuration,
  wherein, upon rotation of the inner housing with respect to the outer housing, the cathode filament is engaged in rotation therewith and the outer housing remains in the fixed position, such that:
  - in the line focus configuration, the elongated body of the cathode filament is substantially parallel to the window, thereby producing a line-shaped X-ray beam; and
  - in the point focus configuration, the elongated body of the cathode filament is substantially perpendicular to the window, thereby producing a point-shaped X-ray beam;
- a sample holder for receiving the sample, the sample being positioned to receive the X-ray beam when held by the sample holder; and
- a detector for receiving X-rays scattered from the sample and outputting an X-ray diffraction pattern therefrom.

16. The X-ray diffraction apparatus of claim 15, further comprising a filter positioned between the window and the sample to condition the X-ray beam.

17. The X-ray diffraction apparatus of claim 15, further comprising a motor assembly in driving engagement with the inner housing, the motor assembly being operable to provide the rotation between the inner housing and the outer housing.

18. A method for producing an X-ray beam with an X-ray source of an X-ray diffraction apparatus, the X-ray source comprising an outer housing having outer housing openings and an inner housing having inner housing openings and rotatably mounted to the outer housing, the inner housing enclosing a vacuum chamber that encloses an anode target and a cathode filament operable to generate an X-ray beam, the method comprising:
- aligning the outer housing openings, the inner housing openings, and a window of the vacuum chamber while maintaining the outer housing in a fixed position;
- rotating the inner housing relative to the outer housing to select a line focus configuration or a point focus configuration; and
- operating the anode target and the cathode filament to generate the X-ray beam according to the selected line focus configuration or point focus configuration.

19. The method of claim 18, further comprising mounting the X-ray source to the X-ray diffraction apparatus.

20. The method of claim 18, further comprising:
- selecting another one of the line focus configuration and the point focus configuration;
- providing a subsequent relative rotation between the inner housing and the outer housing to achieve a subsequent line focus configuration or point focus configuration; and
- operating the anode target and the cathode filament to generate the X-ray beam according to the subsequent line focus configuration or point focus configuration.

* * * * *